United States Patent [19]

Yamasaki et al.

[11] Patent Number: 5,057,062
[45] Date of Patent: Oct. 15, 1991

[54] OPERATING APPARATUS FOR FOUR-WHEEL DRIVE VEHICLE

[75] Inventors: Hirokazu Yamasaki, Higashihiroshima; Nobuyuki Ikemoto; Masaaki Koto, both of Hiroshima, all of Japan

[73] Assignee: Mazda Motor Corporation, Hiroshima, Japan

[21] Appl. No.: 504,029

[22] Filed: Apr. 2, 1990

Related U.S. Application Data

[63] Continuation of Ser. No. 421,921, Oct. 16, 1989, abandoned, which is a continuation of Ser. No. 186,864, Apr. 27, 1988, abandoned.

[30] Foreign Application Priority Data

Apr. 27, 1987 [JP] Japan ................. 62-103644

[51] Int. Cl.$^5$ ........................... B60K 17/34
[52] U.S. Cl. ................. 475/221; 180/248; 180/249; 475/223
[58] Field of Search ........... 74/665 T, 701, 710.5; 180/247, 248, 249, 250; 475/223, 221

[56] References Cited

U.S. PATENT DOCUMENTS

| | | | |
|---|---|---|---|
| 3,895,546 | 7/1975 | Yamaguchi et al. | 74/710.5 X |
| 4,592,442 | 6/1986 | Wilson et al. | 180/247 |
| 4,722,414 | 2/1988 | Rühringer et al. | 180/250 |
| 4,723,622 | 2/1988 | Toshikuni et al. | 74/710.5 X |
| 4,771,853 | 9/1988 | Nishikawa | 180/247 |
| 4,804,061 | 2/1989 | Kameda | 180/247 |
| 4,883,138 | 11/1989 | Kameda et al. | 180/248 X |

FOREIGN PATENT DOCUMENTS

| | | | |
|---|---|---|---|
| 0162334 | 12/1979 | Japan | 74/710.5 |
| 61-9791 | 3/1986 | Japan. | |
| 0143733 | 6/1987 | Japan | 180/248 |
| 0155136 | 7/1987 | Japan | 180/247 |
| 0155137 | 7/1987 | Japan | 180/249 |

Primary Examiner—Allan D. Herrmann
Assistant Examiner—Ryan W. Massey
Attorney, Agent, or Firm—Fleit, Jacobson, Cohn, Price, Holman & Stern

[57] ABSTRACT

A transfer case operation mode shifting apparatus used on a vehicle equipped with part-time four-wheel drive which having a center-differential shiftable between a differential-locked and differential-free drive mode of operation and between a two-wheel and a four-wheel drive mode of operation and a transfer shiftable between a high-speed range and a low-speed range drive mode of operation. The transfer case is shifted in its drive mode of operation by an operation mode selecting member for selecting a desired drive mode of operation. A power drive operation mode shifting device is provided in cooperation with the drive mode selecting member and a controller to actually shift the transfer case from one drive mode of operation to another. The controller is adapted to detect that the center-differential gear assembly of the transfer case is in a differential-locked four-wheel drive mode of operation so as to inhibit a transition of the center-differential to a two-wheel drive mode of operation.

10 Claims, 10 Drawing Sheets

POSITION P2

POSITION P4L

POSITION P4F

OPERATING APPARATUS FOR FOUR-WHEEL DRIVE VEHICLE

This application is a continuation of application Ser. No. 07/421,921, filed Oct. 16, 1989, which is a continuation of application Ser. No. 07/186,864, filed Apr. 27, 1988 both now abandoned.

FIELD OF THE INVENTION

The present invention relates to a transfer case shifting apparatus for a vehicle equipped with part-time four-wheel drive. Part-time four-wheel transfer cases used on vehicles deliver driving power normally only to a front or rear axle assembly and, if desired, to both the front and rear axle assemblies.

BACKGROUND OF THE INVENTION

One such part-time four-wheel transfer case is disclosed in, for example, Japanese Utility Model Publication No. 61-9791 entitled "2-4 Drive Mode Shift Mechanism for a Four Wheel Drive Vehicle", published Mar. 28, 1986. The transfer case taught by the above mentioned Publication has a hydraulic actuator for actuating means to shift a transfer case into two-wheel or a four-wheel drive mode of operation and solenoid valves through which the hydraulic actuator is controlled. The solenoid valves are electrically controlled in such a way to control the hydraulic actuator to shift the transfer case into the two-wheel drive mode of operation if the vehicle is traveling at a high speed. On the other hand, if the vehicle is traveling at a low speed, the transfer case is shifted into the four-wheel drive mode of operation when the transfer case is in a low speed drive range and is selectively shifted into a desired drive mode between the two-wheel and four-wheel drive modes of operations according to a condition of a drive mode shift switch operated by the driver when the transfer case is in a high speed drive range.

In part-time four-wheel vehicles equipped with transfer cases having a center-differential shiftable between locked, and unlocked or free drive modes of operations, the center-differential is allowed to be selectively shifted from one drive mode of operation to another among three drive modes of operations, namely, two-wheel, four-wheel differential-locked and four-wheel differential-free drive modes of operations. In this regard, the provision of electric shift means is contributive to an easy and quick shift operation.

A problem associated with such apparatus is that it is hardly possible to maintain a high travelling stability of the vehicle because, when the vehicle is shifted from the four-wheel drive mode of operation to the two-wheel drive mode of operation, disconnected or non-driving wheels lose their tractive force.

OBJECT OF THE INVENTION

It is, therefore, an object of the present invention to provide a transfer case shift apparatus for a vehicle with part-time four-wheel drive which prevents a transition of the transfer case to a two-wheel driving mode of operation only when the transfer case is in a four-wheel differential-locked drive mode of operation in order to prevent wheels from losing tractive force.

SUMMARY OF THE INVENTION

In carrying out the above and other objects of the present invention, an electrically controlled center-differential shift means is used on the transfer case for the part-time four-wheel drive vehicle. The center-differential shift means includes a drive mode shift means by which the center differential is shifted between two-wheel and four-wheel drive modes of operation and between center-differential-locked and center-differential-free drive modes of operation. Electrically controlling means are provided for causing the drive mode shift means to be actuated according to a driver's drive mode selecting operation. The electrically controlling means operates in a predetermined sequence wherein transitions of the center-differential from one drive mode of operation to another are selectively effected. The sequence includes a step for prohibiting a transition of the center-differential to the two-wheel drive mode of operation when the center-differential is in the four-wheel differential-locked drive mode of operation.

According to a feature of the present invention, when the driver operates the drive mode shifting means in the driver's compartment to effect a transition of the transfer case to a desired drive mode of operation, the controller having the predetermined control sequence of operation causes the drive mode shift means to effect the desired transition of drive mode of operation of the transfer case, namely two-wheel, four-wheel differential-locked or four-wheel differential-free drive modes of operation, excepting a transition to the two-wheel drive mode of operation when the center-differential is in the four-wheel center-differential locked drive mode of operation. Owing to the provision of the control sequence for the drive mode shift means, a vehicle equipped with part-time four-wheel drive embodying the present invention can control wheels to prevent loss of driving or traction force and, thereby, improve the driving stability of the vehicle.

BRIEF DESCRIPTION OF THE DRAWINGS

The foregoing and other objects, features and advantages of the present invention will be understood more clearly and fully from the following detailed description of the preferred embodiment with reference to the accompanying drawings in which.

DETAILED DESCRIPTION OF THE INVENTION

A transfer case and its associated shift means according to a preferred embodiment of the present invention cooperates with various devices and elements, in particular an engine, an engine clutch, a transmission, front and rear axle assemblies and so forth, similar to those of conventional transfer cases. Because such devices and elements are well known to those skilled in the art, this description will be directed in particular to elements forming part of, or cooperating directly with, the transfer case and its associated shift control embodying the present invention. It is to be understood that elements of the transfer case and its associated shift control not specifically shown or described herein may be selected from those known in the art.

Figure 1A:
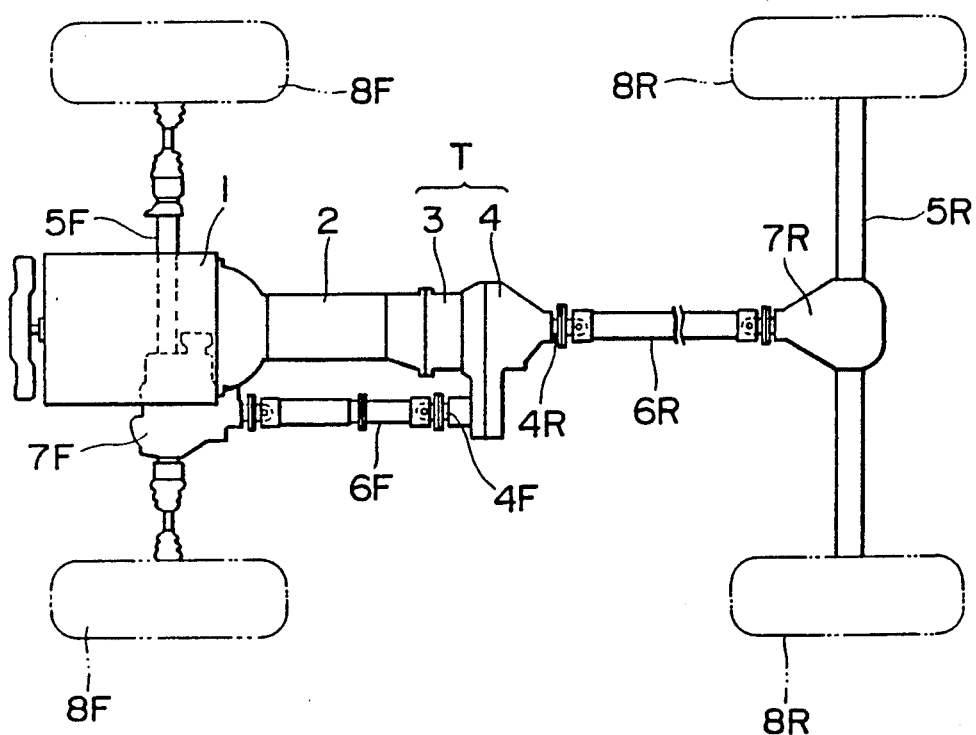
FIG. 1A is a schematic plan view showing a power train for a part-time four-wheel drive vehicle embodying the present invention.
Figure 1B:
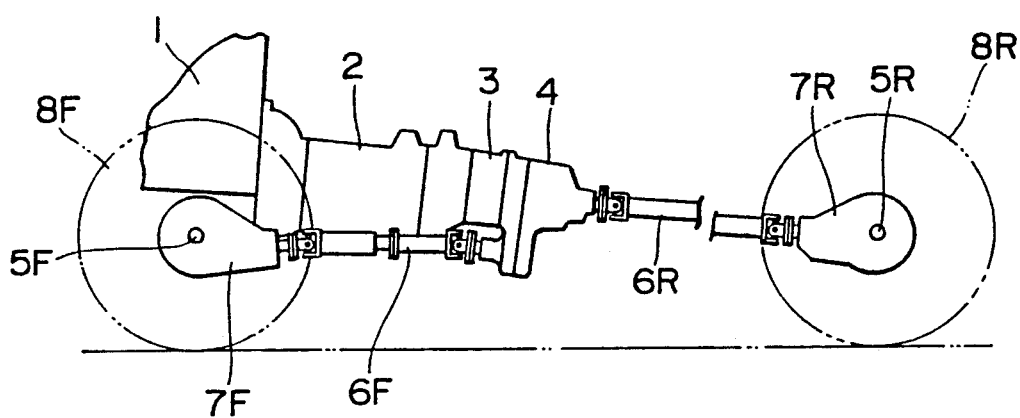
FIG. 1B is a schematic elevational view of the power train of FIG. 1A.

Referring now to the drawings, wherein like reference characters designate corresponding or similar parts or elements throughout the several views, there is generally schematically shown in FIGS. 1A and 1B a power train of a vehicle equipped with part-time four-wheel drive which has an engine unit 1, a transmission case 2 connected to the engine 1 through an engine clutch (not shown), a transfer case T including a transfer gear assembly 3 and a center-differential gear assembly 4 arranged in order from the front end of the vehicle. A rear wheel drive shaft or rear output shaft 4R of the center-differential gear assembly 4 is coupled to a rear axle shaft 5R through a rear propeller shaft 6R and a rear axle differential case 7R by which a pair of rear wheels 8R are turned differentially. A front wheel drive shaft or front output shaft 4F of the center-differential gear assembly 4, which is laterally spaced from and located in parallel with the rear output shaft 4R, is coupled to a front axle shaft 5F through a front propeller shaft 6F and a front axle differential case 7F by which a pair of front wheels 8F are turned differentially. As is well known to those skilled in the art, each propeller shaft 6R, 6F is coupled at its both ends to the output shaft 4R, 4F and the axle differential case 7R, 7F by means of universal joints.

The front axle 5F is equipped with a free-wheeling means (which will be described in detail with reference to FIG. 4 later) which, when the transfer case T 3 is in two-wheel drive mode, disconnects the transmission of power between the front axle differential case 7F and the front wheels 8F.

Figure 2:
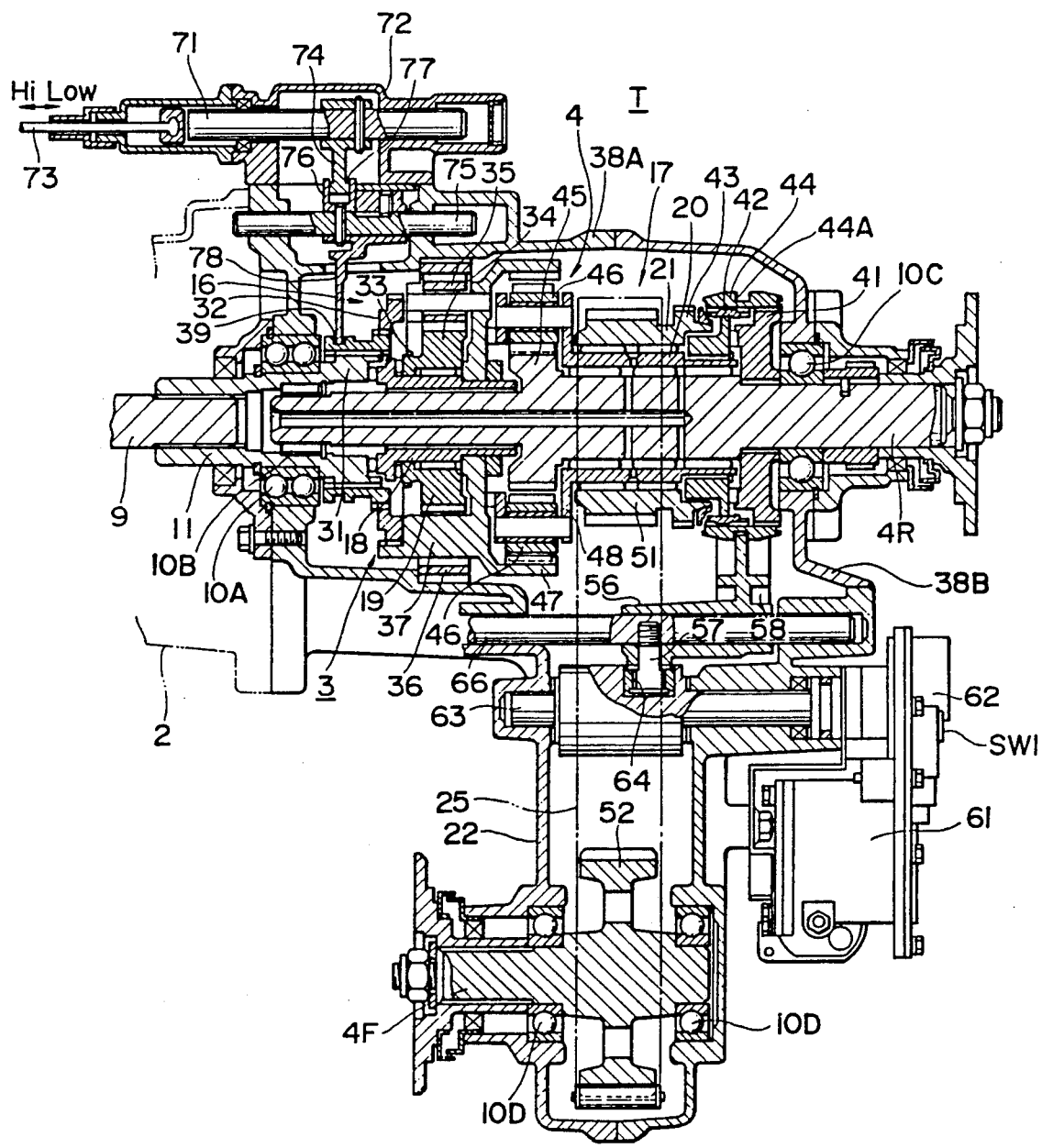
FIG. 2 is a sectional view showing details of the transfer case of the power train of the vehicle equipped with part-time four-wheel drive which is in a two-wheel drive mode.

Referring now to FIG. 2 shown therein in longitudinal section is the transfer case T comprising the transfer gear assembly 3 and center-differential gear assembly 4, each of which basically comprises a planetary gear assembly. As shown, the transfer case T has three rotatable shafts, namely, a transfer input shaft 11 in the form of a hollow tube which is supported by a ball bearing 10A held in a front-half transfer case housing 38A for rotation and is spline-coupled to an output shaft 9 of the transmission assembly 2; the rear output shaft 4R located coaxially relative to the transfer input shaft 11 and supported at its one end by a needle bearing 10B held in the transfer input shaft 11 and at its opposite end by a ball bearing 10C held in a rear-half transfer case housing 38B for rotation; and the front output shaft 4F laterally spaced from and located in parallel with both of the transfer input shaft 11 and the rear output shaft 4R and supported by a pair of ball bearings 10D held in an extension housing 22 formed by portions of the front- and rear-half transfer case housings 38A and 38B. The transfer gear assembly 3 and the center-differential gear assembly 4 which will be described in detail later are mounted on the rear output shaft 4R.

Arranged coaxially with the transfer gear assembly 3 and the center-differential gear assembly 4 are two shift means; namely a transfer gear shift means 16 in cooperation with the transfer gear assembly 3 on the front or left side of the transfer gear assembly 3 and a differential gear shift means 17 in cooperation with the center-differential gear assembly 4 on the front or left side of the center-differential gear assembly 4, as shown in FIG. 2.

The transfer gear assembly 3 which is selectively shiftable into a desired drive range, namely, a low speed drive range or a high speed drive range (which is hereinafter noted by L or H drive mode on descriptive listings), to transmit driving power with or without torque multiplication from the transmission case 2 to the center-differential gear assembly 4, consists of a first planetary gear assembly having a ring gear 36 fixed to the front-half transfer housing 38A, a sun gear 34 mounted on the first sleeve shaft 18 spline-coupled to the rear output shaft 4R for rotation, and pinion gears 35 rotatably supported by a carrier member 37 fixed to the first sleeve shaft 18.

On the front side of the transfer gear assembly 3, there is the transfer gear shift means 16 for shifting the transfer gear assembly 3 between two different drive modes, namely the L and H drive modes. This transfer gear shift means 16, which basically takes the form of a sleeve clutch mechanism, consists of first externally-splined clutch ring 31 formed at one end portion of the transfer input shaft 11, second internally-splined clutch ring 32 spline-coupled to the carrier member 37 of the first planetary gear assembly, third externally-splined clutch ring 33 formed on the sun gear 34 of the first planetary gear assembly, and first splined clutch sleeve 39 spline-coupled to the first clutch ring 31 for axial movement. This first clutch sleeve 39 is axially movable to be selectively brought into spline engagement with the second or the third clutch ring 32 or 33. When the first clutch sleeve 39 is axially displaced and placed in position shown in FIG. 2, the first clutch sleeve 39 engages with the second clutch ring 32 so as to couple the first and second clutch rings 31 and 32 and thereby to lock together the transfer input shaft 11 and the pinion gears 35 of the first planetary gear assembly; the transfer gear assembly 3 is shifted into the H drive range. At this time, the transfer input shaft 11 and the center-differential gear assembly 4 are locked together through the carrier member 37 with which the second clutch ring 32 is integrally formed. This gives direct drive between the transfer input shaft 11 and the center-differential gear assembly 4 through the transfer gear assembly 3.

On the other hand, when the first clutch sleeve 39 is moved axially toward the transfer gear assembly 3 until having disengaged over the second clutch ring 32, the first clutch sleeve 39 is brought into spline-engagement with the third clutch ring 33 so as to couple the first and third clutch rings 31 and 33; the transfer gear assembly 3 is shifted into the L drive mode so as to transmit driving power with a torque multiplication from the transfer input shaft 11 of the transfer gear assembly 3, specifically the sun gear 34 to the ring gear 36 through the pinion gears 35, and hence to the center-differential gear assembly 4 in cooperation with the carrier member 37 of the first planetary gear assembly as the transfer gear assembly 3.

The center-differential gear assembly 4, which can drive both the front and rear axles at the same time but allows them to turn at different speeds as is well known in the art, consists of a second planetary gear assembly that comprises a sun gear 45 formed integrally with a periphery of the middle section of the rear output shaft 4R; a ring gear 47 formed integrally with the rear end portion of the carrier member 37 of the first planetary gear assembly, and pinion gears 46 rotatably attached to carrier member 48 which is integral with third sleeve shaft 20 mounted on the rear output shaft 4R for rotation.

On the rear side of the center-differential gear assembly 4, there is the differential gear shift means 17 which shifts the center-differential gear assembly 4 between differential-free and -locked drive modes (which are hereinafter referred to as DF and DL drive mode), or between the two-wheel and four-wheel drive modes (which are hereinafter referred to as 2W and 4W drive modes). This differential gear shift means 17 consists of fourth externally splined clutch ring 41 spline-coupled to the rear output shaft 4R, fifth externally splined clutch ring 42 spline-coupled to the third sleeve shaft 20, sixth externally splined clutch ring 43 formed integrally with fourth sleeve shaft 21 which is mounted on the third sleeve shaft 20 for rotation, and second clutch sleeve 44. This second clutch sleeve 44, which is spline-coupled to the fifth clutch gear 42, is axially movable to selectively engage with the fourth clutch ring 41 or the sixth clutch ring 43 so as to shift the center-differential gear assembly 4 into a desired drive mode. The fourth sleeve shaft 21 is integrally formed with a driving sprocket wheel 51 which is connected to a driven sprocket wheel 52 formed integrally with the front output shaft 4F by means of a chain 25 (shown by a dotted line in FIG. 2).

This differential gear shift means 17 can shift the center-differential gear assembly 4 into any one of three different drive modes, namely, 2W drive mode, 4W-DF drive mode, and 4W-DL drive mode.

Figure 3A:
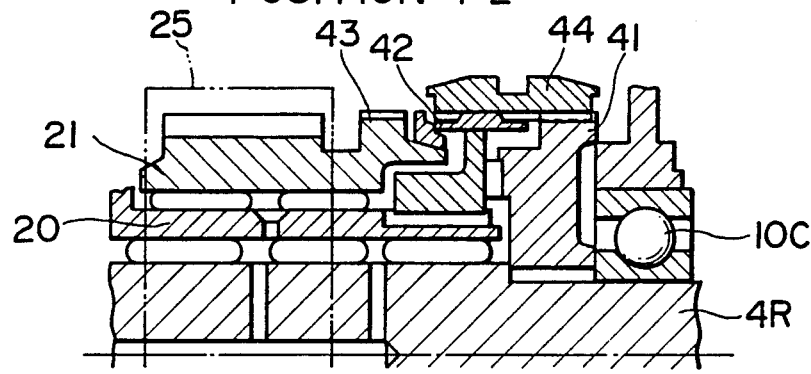
FIGS. 3A to 3C are sectional views showing details of the transfer gear shift means of the transfer case of FIG. 2 which are in the two-wheel drive mode, a four-wheel, differential-locked drive mode and a four-wheel differential-free drive mode, respectively.

When the differential gear shift means 17 is ready for the 2W drive mode as is shown in FIG. 2 and in more detail in FIG. 3A, the second clutch sleeve 44 is in engagement with the fourth and fifth clutch rings 41 and 42 and, on the other hand, in disengagement over the sixth clutch ring 43. Under this 2W drive mode, the sun gear 45 and the pinion gears 46 of the second planetary gear assembly are locked together, transmitting driving torque from the ring gear 47 of the second planetary gear assembly directly to the rear output shaft 4R.

Figure 3B:
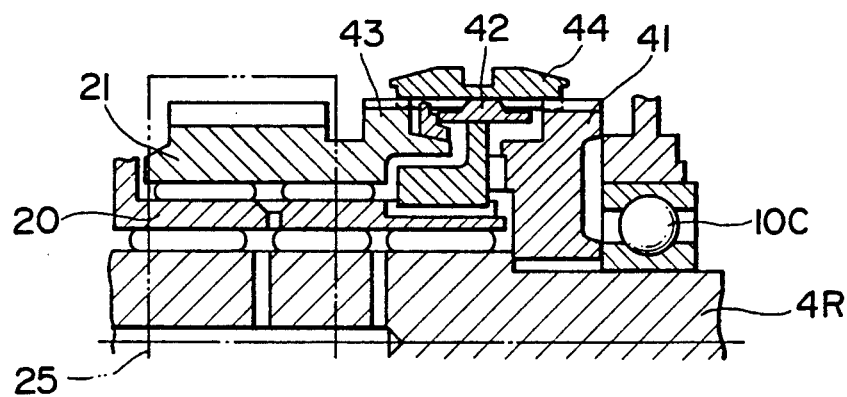
Figure 3C:
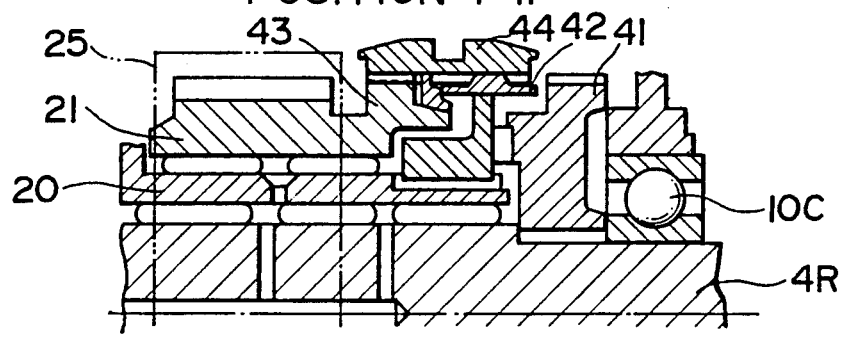

When the differential gear shift means 17 is ready for 4W-DF drive mode as is shown in FIG. 3C, the second clutch sleeve 44 is brought into spline engagement with the fifth and sixth clutch rings 42 and 43 but out of engagement over the fourth clutch ring 41. Therefore, the third and fourth sleeve shafts 20 and 21 are locked together through the fifth and sixth clutch rings 42 and 43 to shift the center-differential gear assembly 4 into 4W-DF mode. As a result, the center-differential gear assembly 4 allows the front and rear output shafts 4F and 4R to turn at different speeds when negotiating a turn.

When the differential gear shift means 17 is ready for the 4W-DL drive mode as is shown in FIG. 3B, the second clutch sleeve 44 is placed in engagement with all the three clutch rings, namely the fourth, fifth and sixth clutch rings 41, 42 and 43. Under this 4W-DL drive mode, the third and fourth sleeve shafts 20 and 21 are locked together to maintain the center-differential gear assembly 4 in the 4W drive mode. Simultaneously, since the rear output shaft 4R and the third sleeve shaft 20 are locked together, the center-differential gear assembly 4 is shifted into the 4W-DL drive mode. As a result, although the center-differential gear assembly 4 drives the front and rear output shafts 4F and 4R at the same time but prevents them from turning at different speeds.

As can be understood from the above description, since the fourth clutch ring 41 is spline-coupled to the rear output shaft 4R with which the sun gear 45 of the center-differential gear assembly 4 is integrally formed and the sixth clutch ring 42 is spline-coupled to the third sleeve shaft 20 to which the pinion gears 46 of the second planetary gear assembly are fixed by the integrally formed carrier member 48, the fourth and fifth clutch rings 41 and 42 are allowed to make a relative turn slightly either in the opposite directions or the same direction with respect to each other by the aid of a back lash given between the sun gear 45 and the pinion gears 46 of the second planetary gear assembly. Due to this relative turn between the fourth and fifth clutch rings 41 and 42, the second clutch sleeve 44 can be smoothly and easily brought into spline engagement with the fourth clutch gear 41 so as to couple together the sun gear 45 and the pinion gears 46 of the second planetary gear assembly serving as the center-differential gear assembly 4.

On the other hand, since the fourth sleeve shaft 21 having the sixth clutch ring 43 formed integrally therewith is mounted for rotation on the third sleeve shaft 20 having the fifth clutch ring 42, the fifth and sixth clutch rings 42 and 43 are also allowed to turn relative to each other by the aid of a rotational play produced between the third and fourth sleeve shafts 20 and 21. Due to this relative turn between the third and fourth sleeve shaft 20 and 21, the second clutch sleeve 44 can be easily and smoothly brought into spline engagement with the sixth clutch ring 43 and, simultaneously, brought out of engagement with the fourth clutch ring 41, so as to couple together the pinion gears 46 of the second planetary gear assembly as an output member of the center-differential gear assembly 4 and the driving sprocket wheel 51, and hence the front output shaft 4F through the driven sprocket wheel 52.

The front and rear output shafts 4F and 4R of the transfer case T are coupled to the front and rear axle differential cases 7F and 7R through the propeller shafts 6F and 6R, respectively. The front axle differential case 7F, as is shown in detail in FIG. 4, has a front axle differential housing 107 in which a front axle differential gear assembly 108 is supported for rotation. This front axle differential gear assembly 108 comprises a differential carrier 109 supported by and within the front axle differential housing 107 for rotation; left and right half axle shafts 116L and 116R, which are parts of the front axle shaft 5F, disposed coaxially and extending in the axial direction; a pair of differential side gears 110L and 110R spline-coupled to the inner ends of the left and right half axle shafts 116L and 116R, respectively; and a pair of differential pinions 112 which are fixedly mounted on a pinion shaft 111 supported by and disposed within the differential carrier 109 and are in mesh with the differential side gears 110L and 110R, respectively. Bolted to an outer annular flange 109a of the differential carrier 109 is a ring gear 113 in the form of a bevel gear which is in mesh with a driving pinion gear 114 formed integrally with an input shaft 115 coupled to the front output shaft 4F of the transfer case T through the front propeller shaft 6F.

Disposed on the right side of the front axle differential case 7F is axle splitting means 120 of free-wheeling means 130. Coaxially disposed adjacent to the right side half axle shaft 116R which is one of the output shaft of the front axle differential case 7F is a joint axle 117 coupling together the right side half axle 116R and the right side wheel 8F. The joint axle 117 has its inner spindle section 117a having a diameter smaller than that of the major portion thereof and, on the other hand, the right side half axle 116R has its outer enlarged section 116a formed with a bore 116b which receives and supports therein the inner spindle section 117a of the joint axle 117 for rotation. On the outer periphery of the enlarged diameter section 116a of the right side half axle 116R, there are formed with splines 116c. Spline coupled to the inner spindle section 117a of the joint axle 117 is an annular ring 118 formed with external splines 118a. A shift sleeve clutch 119 is provided to lock and unlock the right side axle 116R and the joint axle 117 through spline coupling. When the shift sleeve clutch 119 locks together the right side axle 116R and the joint axle 117, the front axle differential case 7F is directly connected to the right side front wheel 8F to transmit driving power from axle differential case 7F to the right side front wheels 8F. However, if the shift sleeve clutch 119 is displaced to unlock or split the right side half axle shaft 116R and the joint axle 117, no driving power is transmitted between the front axle differential case 7F and the right side front wheel 8F.

The shift sleeve clutch 119 is formed with an external annular recess 119a for receiving a shift fork 121 fixed to a shift control rod 122. At one end of the shift control rod 122, there is diaphragm means 123 functioning as an actuator for the shift control rod. This diaphragm means 123 comprises a diaphragm 124 connected to the outer end of the shift control rod 122, first and second pressure chambers 125 and 126 divided by the diaphragm 124 in a housing. As is shown in FIG. 5, the first and second pressure chambers 125 and 126 are in communication with an intake pipe (not shown) of the engine unit 1 through pipes 133 and 134, respectively, so as to introduce negative pressure thereinto. In the pipes 133 and 134, there are normally closed first and second solenoid valves 131 and 132, respectively to control the axle splitting means 120. In more detail, when the first solenoid valve 131 is opened, the pressure inside the first pressure chamber 125 becomes negative with respect to the pressure inside the second pressure chamber 126 so as to deflect the diaphragm 124 toward the first pressure chamber 125, thereby to displace axially the shift control rod 122 to the right. As a result, the shift sleeve clutch 119 is displaced to the right from the position shown in FIG. 4 so as to unlock the right side half axle shaft 116R of the front axle differential case 7F from the joint axle 117 connected to the right side front wheel 8F. When the right side half axle shaft 116R and the joint axle 117 are unlocked, no motion of the front wheels 8F is transmitted to the differential side gears 110R and the differential pinion gears 112 of the front axle differential case 7F, thereby no differential motion is caused between the front wheels 8F and the transfer case T is not affected by the motion of the front wheel. The shift control rod 122 moved to the right is detected by means of a free-wheeling unlock sensor SW3 such as a limit switch which provides an unlock signal indicating that the axle splitting means 120 is completely unlocked.

Figure 4:
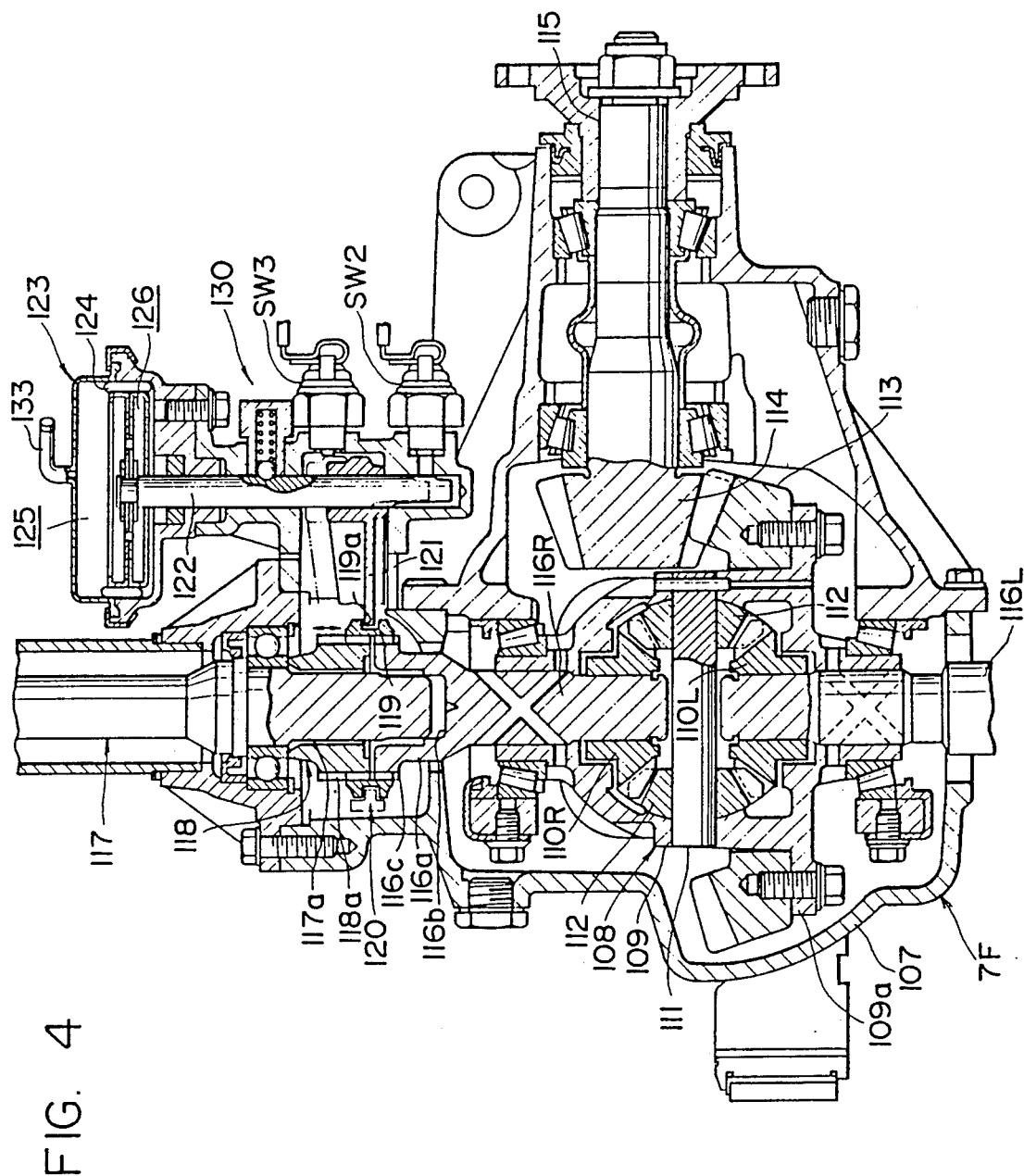
FIG. 4 is a cross sectional view of a front axle differential case.
Figure 5:
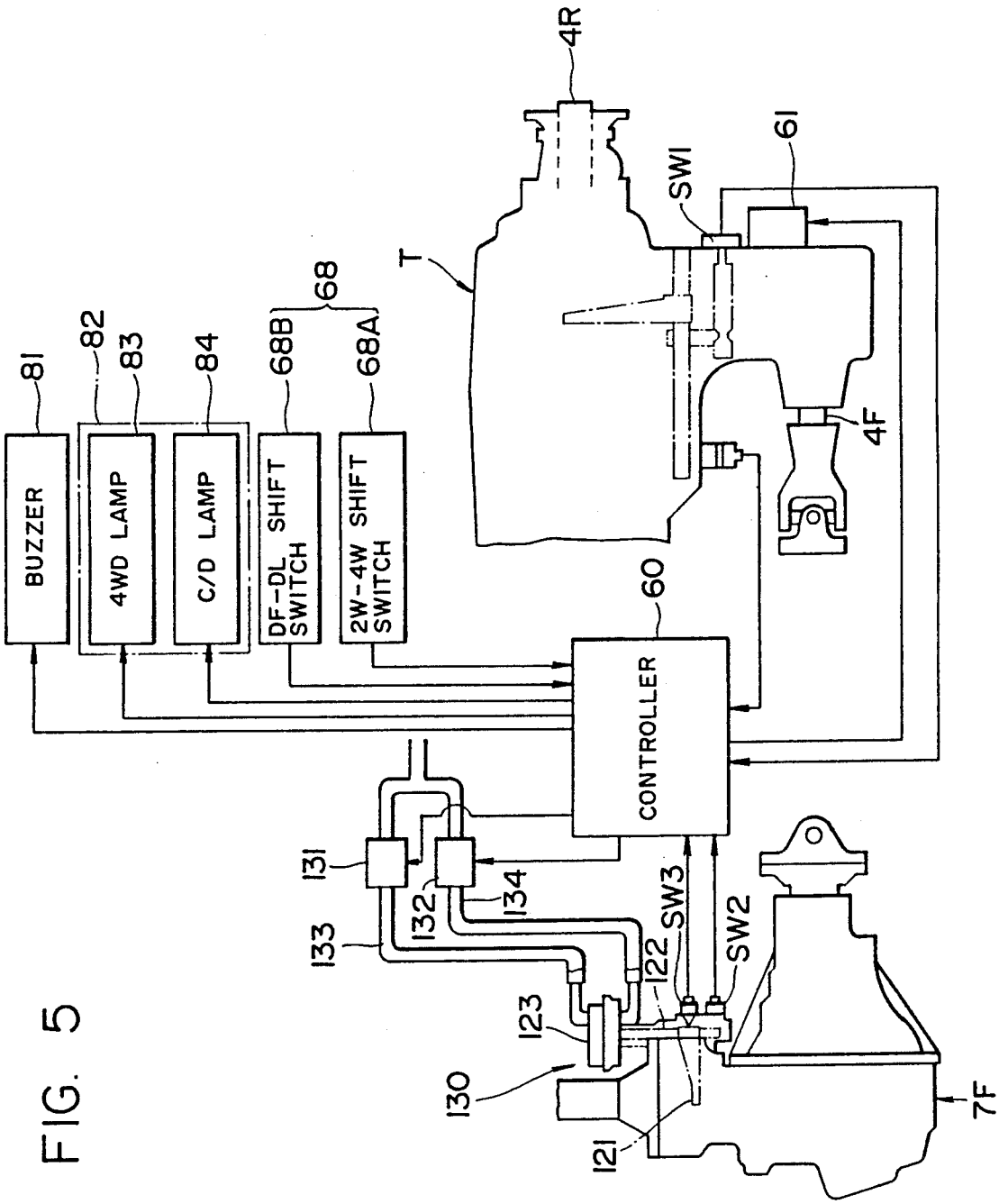
FIG. 5 is a schematic illustration, partly in block diagram, showing a transfer case shift control system.

On the other hand, when the second solenoid valve 130 is opened, the second pressure chamber 126 becomes negative with respect to the pressure inside the first pressure chamber 125 so as to deflect the diaphragm 124 toward the second pressure chamber 126, thereby to displace the shift control rod 122 to the left as shown in FIG. 4. As a result, the shift sleeve clutch 119 is displaced in the opposite side and returns to the position shown in FIG. 4 so as to lock together the right side half-axle shafts 116R of the front axle differential gear assembly 108 and the joint axle 117. Through the right side half-axle shafts 116R and the joint axle 117 locked together, an ordinary differential motion is caused between the front wheels 8F. The shift control rod 122 moved to the left is detected by means of a free-wheeling lock sensor SW2 such as a limit switch which provides a lock signal indicating that the axle splitting means 120 is completely locked.

Figure 6A:
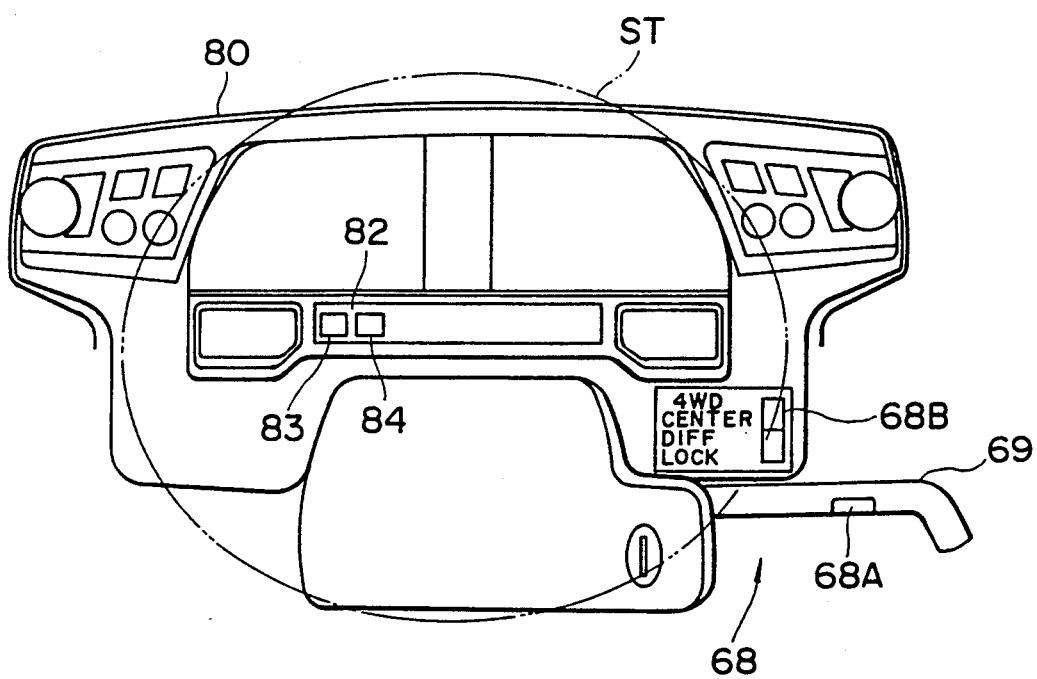
FIG. 6A is a schematic illustration showing the transfer case shift means arranged in a driver's compartment of a vehicle.
Figure 6B:
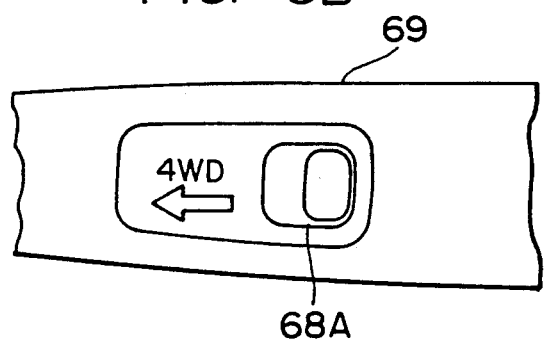
FIG. 6B is an illustration showing a 2W-4W shift switch disposed in a column shift lever of the transfer case shift means of FIG. 6A.
Figure 7:
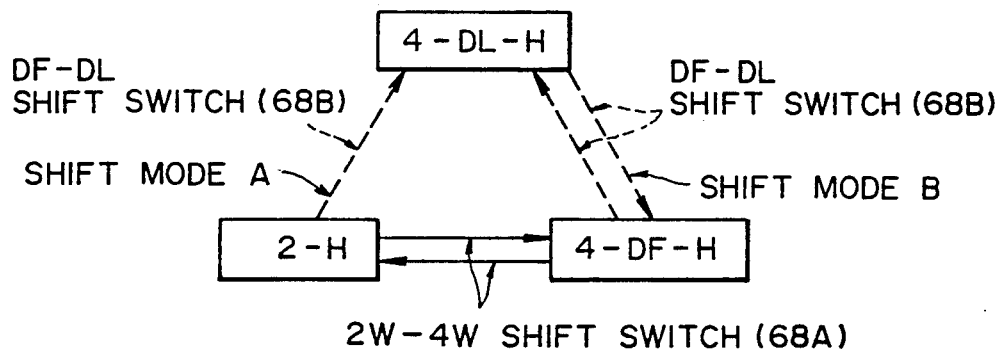
FIG. 7 is an explanatory diagram showing possible transition modes of the transfer case of FIG. 2.

Referring to FIGS. 6A and 6B, for effecting the above-described drive mode shifting of the transfer gear assembly 3 and the center-differential gear assembly 4 of the transfer case T, there may be a transfer shift means 68 comprising a manual shift lever 69, a 2W-4W shift switch 68A and a DF-DL shift switch 68B. The manual shift lever 69 is in the form of a column shift lever as is shown in FIGS. 6A and 6B. This manual shift lever 69 is provided on a steering column (not shown) for mounting a steering wheel ST and is operated between two operating positions, namely L drive mode selecting position and a H drive mode selecting position. The manual shift lever 69 is operationally connected to the transfer case T. In more detail, this manual shift lever 69 is operationally connected to a shift control rod 71 which is supported within an extension 72 of the front-half transfer case housing 38A for axial movement through a push-pull type connecting cable 73, as is shown in FIG. 2. Fixedly mounted on the shift control rod 71 is a connecting pin 74 extending downwardly.

Referring again to FIG. 2, disposed in juxtaposition with the shift control rod 71 is a supporting rod 75 supported in the extension 72 of the front-half transfer case housing 38A for axial movement. The supporting rod 75 carries an annular sleeve member 76 formed with a peripheral groove 77 which is engaged by a connecting pin 74 of the shift control rod 71 and which has a shift fork 78 extending radially downwardly. As seen in FIG. 2, the shift fork 78 of the annular sleeve member 76 is in circumferential slidable engagement with an annular groove 39A formed in the periphery of the first clutch sleeve 39 of the first or transfer gear shift means 16.

When the manual shift lever 69 in the driver's compartment is operated and placed in the H drive mode selecting position, the shift control rod 71 is displaced axially to move the first clutch sleeve 39 of the transfer gear shift means 16 in position (shown in FIG. 2), coupling together the first and second clutch rings 31 and 32, namely the transfer input shaft 11 and the carrier member 37 of the first planetary gear assembly, thereby shifting the transfer gear assembly 3 into the high speed range or H drive mode.

On the other hand, when the manual shift lever 69 in the driver's compartment is operated or reversed to select the L drive mode selecting position, the shift control rod 71 is displaced axially rearwardly to move the first clutch sleeve 39 of the transfer gear shift means 16 rearwardly in position so as to disengage the first clutch ring 31 over the second clutch ring 32 and to bring the first clutch ring 31 and the third clutch ring 33 into spline-engagement, thereby coupling together the transfer input shaft 11 and the sun gear 34 of the first planetary gear assembly to shift the transfer gear assembly 3 into the low speed range or L drive mode.

For shifting the center-differential gear assembly 4 between different drive modes by means of the second or differential gear shift means 17, there is provided a control unit 60 (see FIG. 5) including a CPU for controlling a reversible electric motor 61 with its associated reduction gear 62 which cooperates with a shift control rod 63 supported by the rear-half transfer case housing 38B for rotation and having a cam groove 64 formed on its outer periphery thereof. Placed in juxtaposition with the shift control rod 63 is a guide rod 66 on which a sleeve member 56 is fixedly attached. The sleeve member 56 is provided with a connecting pin 57 by which the cam groove 64 of the shift control rod 63 is slidably engaged and a fork member 58, the connecting pin 57 and fork member 58 being axially spaced from and extending radially oppositely to each other. The fork member 58 is in circumferential slidable engagement with an annular groove 44A formed on a periphery of the second clutch sleeve 44 of the second or differential gear shift means 17. Shown at SW1 is a drive mode sensor provided to detect angular positions of the shift control rod 63 corresponding to the positions $P_2$, $P_{4L}$ and $P_{4F}$ (see FIGS. 3A to 3C) of the second shift sleeve 17 and to provide a shift mode signal A when the transfer case T is shiftable between the 2W-H drive mode and the 4W-DL-H drive mode or a shift mode signal B when the transfer case is shiftable between the 4W-DL-H drive mode and the 4W-DF-H drive mode. The mode signal A or B is sent to the controller 60.

For effecting an above-described drive mode transition or shifting of the center-differential gear assembly 4, the transfer shift means 68, as is shown in FIGS. 6A and 6B, comprises the 2W-4W shift switch 68A disposed on the column shift lever 69 and a DF-DL shift switch 68B disposed in an instrument panel 80 in the driver's compartment.

The 2W-4W shift switch 68A of the transfer shift means 68 which may take the form of a slidable dipswitch is always urged to a position shown in FIG. 6B and is adapted to provide the controller 60 with a shift signal when it is firstly operated fully to the left or a 4W drive mode selecting position and with a shift-back signal when it is again operated to the 4W drive mode selecting position. When the shift signal is provided, the controller 60 causes the electric motor 61 to rotate in one direction (which is hereinafter referred to as the CCW direction), turning the shift control rod 63 through the reduction gear 62 in order to axially displace the guide rod 66 with the sleeve member 56 fixed thereto through the sliding engagement between the connecting pin 57 and the cam groove 64, thereby axially displacing the second clutch sleeve 44 of the differential gear shift means 17. As a result, the second clutch sleeve 44 spline-coupled to the fifth clutch ring 42 is axially displaced to be selectively brought into spline engagement with the sixth clutch ring 43 of the fourth hollow sleeve shaft 21 (see FIG. 3B) so as to shift the center-differential gear assembly 4 into the 4W drive mode. On the other hand, when the shift-back signal is provided, the controller 60 causes the motor 61 to rotate in the reversed or opposite direction (which is hereinafter referred to as the CW direction), displacing the second clutch sleeve 44 of the differential gear shift means 17 to the position $P_2$ (FIG. 3A) so as to shift back the center-differential gear assembly 4 into the 2W drive mode.

The DF-DL shift switch 68B, which may take the form of a push-in-push-back type switch adapted to be held pushed-in until being pushed again, provides the controller 60 with a lock signal for the push-in operation thereof and with an unlock signal for the push-back operation thereof. When the lock signal is provided, the controller 60 causes the motor 61 to rotate in the CCW direction so as to displace and couple the second clutch sleeve 44 to both the fifth and sixth clutch rings 41 and 43, thereby to shift the center-differential gear assembly 4 into the DL (differential-locked) drive mode. On the other hand, when the unlock signal is provided, the controller 60 causes the motor 61 to reverse in rotation so as to return and couple the clutch sleeve 44 to the sixth clutch ring 43, thereby to shift back the center-differential gear assembly 4 in the DF (differential-free) drive mode.

By various combined operations of the shift lever 69, 2W-4W shift switch 68A and DF-DL shift switch 68B of the transfer shift means 68, the transfer case T is shifted. Specifically, when the manual shift lever 69 is operated to displace the first clutch sleeve 39 of the transfer gear shift means 16 to the H drive mode selecting position through the shift control rod 71, the transfer gear assembly 3 is shifted in the H drive mode. As a result, the transfer case T becomes ready for being selectively shifted between the 2W-H and 4W-DF-H drive modes by the operation of the 2W-4W shift switch 68A; between the 4W-DF-H and 4W-DL-H or from the 2W-H to the 4W-DL-H drive mode by the operation of the DF-DL shift switch 68B.

In FIG. 5, connected to the controller 60 are a buzzer 81 and a mode indicator 82. The mode indicator 82 which is, as is shown in FIG. 6A, installed in the instrument panel 80 of the driver's compartment comprises a 4W drive mode indicator lamp or 4WD lamp 83 flashing when the 2W-4W shift switch 68A is operated to select the 4W drive mode and a center-differential mode indicator lamp or C/D lamp 84 flashing when the DF-DL shift switch 68B is operated to select the DL drive mode. As is previously described, the 2W-4W shift switch 68A and the DL-DF shift switch 68B of the transfer shift means 68 are electrically connected to the controller 60.

The controller 60 sequentially controls operations of various elements, for example the motor 61 solenoid valves 131 and 132, buzzer 81 and drive mode indicator 82. The sequential operation of the controller will be described with reference to FIGS. 8 to 15 showing several flow charts of a mainroutine and subroutines. It is to be noted in FIGS. 8 through 15 that effected at steps indicated by S4, S8, S12, S14, S16, S21, S24, S27, S31, S33, S35 to S37 and S38 are decisions, although not illustrated by a diamond.

Figure 8:
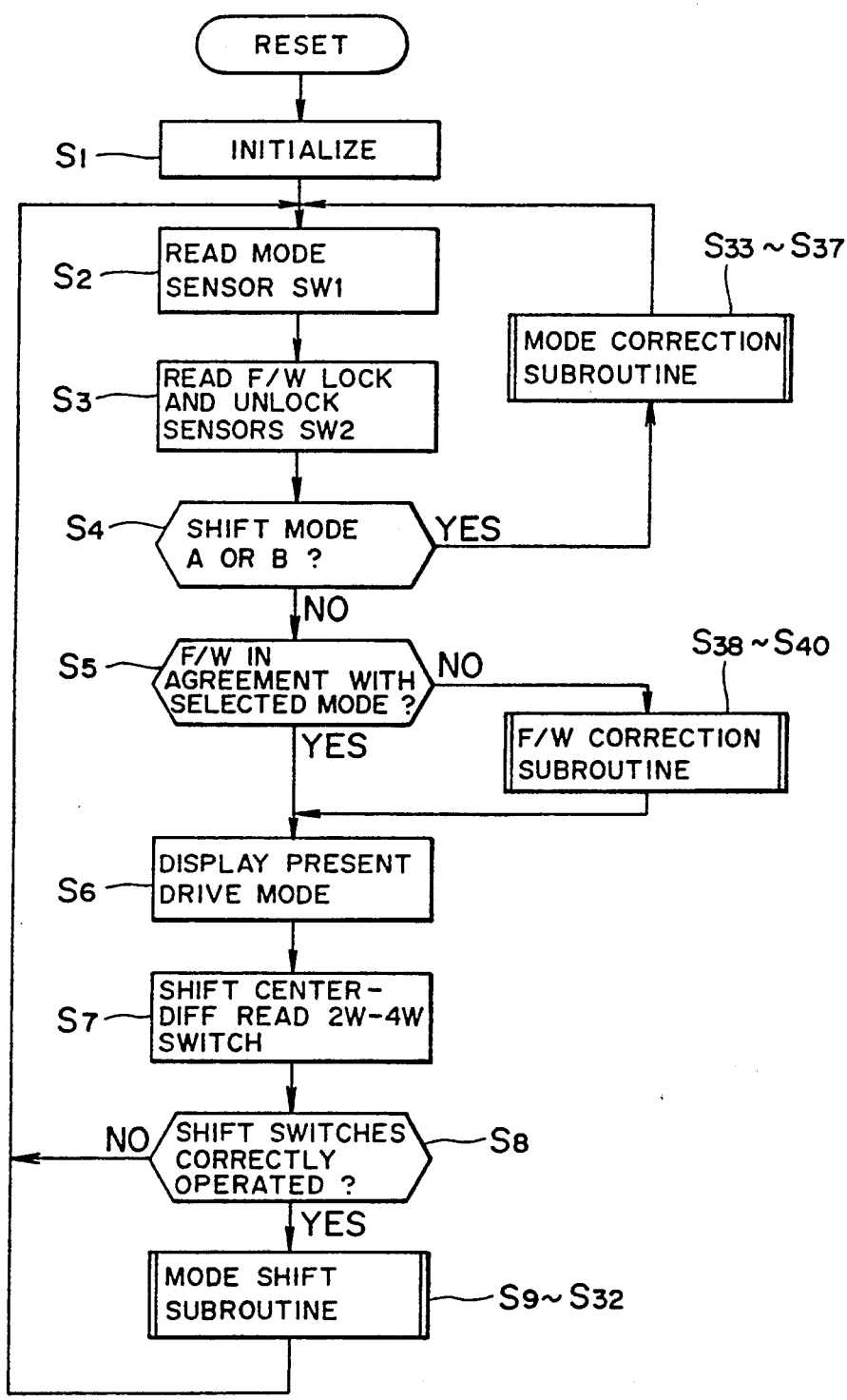
FIG. 8 is a flow chart illustrating a general sequence or main routine for a controller which controls the drive mode shift means.

Referring now to FIG. 8, which is a flow chart illustrating a main routine for the controller 60, in particular the CPU included therein, the first step S1 is to initialize. Following the initialization, the next step is to read the condition of the drive mode sensor SW1 at a second step S2 and to read the conditions of the free-wheeling lock and unlock sensors SW2 and SW3 as a third step S3. At a step S4, based on the condition of the drive mode sensor SW1, a first decision is made to determine whether the transfer case T is in a transition or shift mode A (in which the transfer case T is shiftable between the 2W-H drive mode and 4W-DL-H drive mode) or in a transition or shift mode B (in which the transfer case is shiftable between the 4W-DL-H and 4W-DF-H drive modes). In other words, a decision regarding whether the transfer case T has been ready for any shift mode other than a shift mode between the H and L drive modes. If the answer is yes, indicating the transfer case T is in the shift mode A or B, a mode correction subroutine shown in FIG. 9 is called for.

Figure 9:
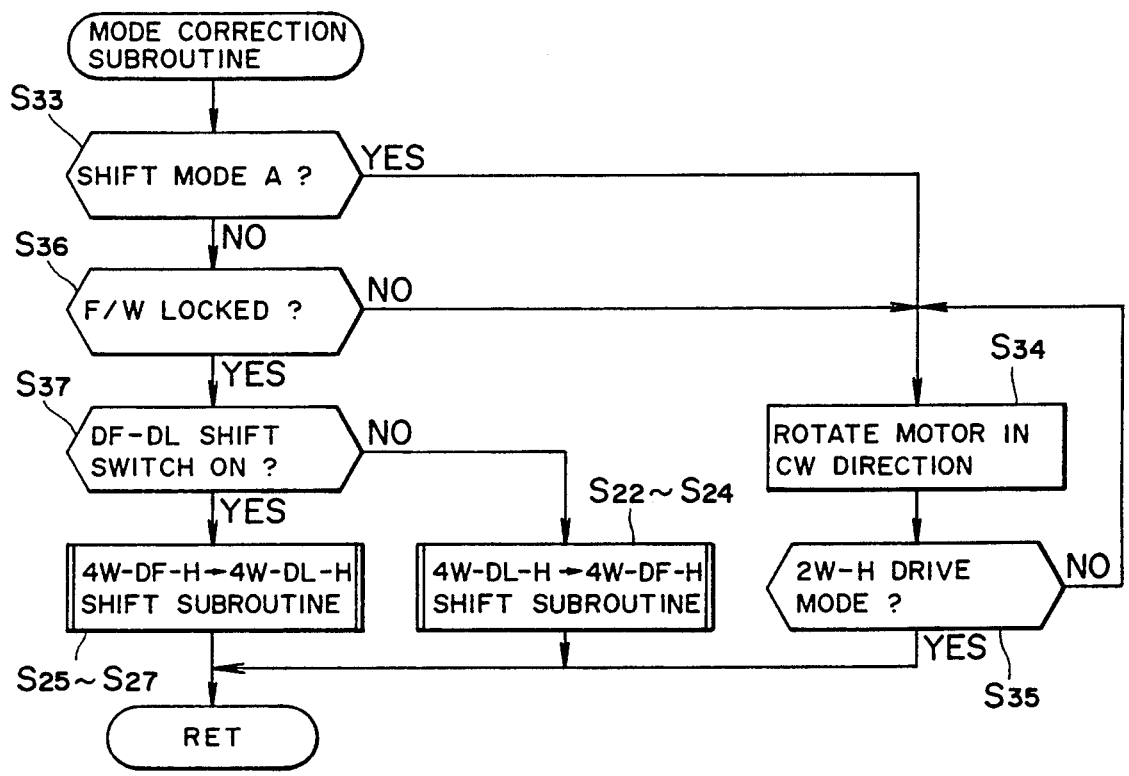
FIG. 9 is a flow chart illustrating a drive mode correction sequence or subroutine for the controller.

Referring to FIG. 9, which is a flow chart of the mode correction subroutine, the first step S33 in FIG. 9 is to make a first decision: "is the transfer case ready for the shift mode A?" If the answer to the first decision is yes, the motor 61 is caused to rotate in the CW direction at a step S34 so as to shift the transfer case T into the 2W-H drive mode. When the motor 61 is actuated, a second decision is made based on the drive mode signal provided by the mode sensor SW1 at a step S35: "is the transfer case T shifted in 2W-H drive mode?" This second decision is repeated until the transfer T is completely shifted into the 2W-H drive mode. If the answer to the second decision regarding shifting the transfer case T is yes, the final step orders return to the main routine.

If the answer the first decision regarding to the shift mode of the transfer case T is no, a third decision is made based on the conditions of free-wheeling lock and unlock sensors SW2 and SW3 at a step S36: "is the free-wheeling means locked?" If the answer to the third decision is no, indicating the free-wheeling means is unlocked or free, the motor 61 is caused to rotate so as to shift the transfer case T into the 2W-H drive mode. On the other hand, if the answer to the third decision is yes, a fourth decision is made based on the operated condition of the DF-DL shift switch 68B at a step S37: "is the DF-DL shift switch 68B on or pushed in?" According to the answers to the fourth decision, a third or a fourth drive mode shift subroutine is called for. Specifically, if the answer is no, the third shift subroutine is called for and, on the other hand, if yes, the fourth shift subroutine is called for. These third and fourth drive mode shift subroutines will be described along with first, second and fifth drive mode shift subroutines in detail later.

Referring back to the main routine in FIG. 8, if the answer to the first decision is no, this indicates that the transfer case T is neither in the shift mode A nor in the shift mode B, a second decision in the main routine is made at a step S5: "is the drive mode of the transfer case T in agreement with the state of the free-wheeling means 130?" If the answer to the third decision is no, a free-wheeling (F/W) mode correction subroutine is called for.

Figure 10:
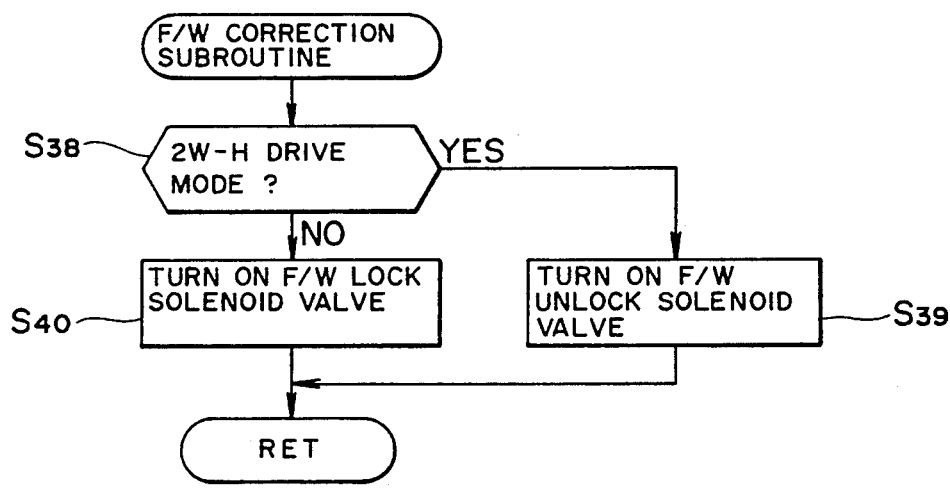
FIG. 10 is a mode correction sequence or subroutine for the controller which correctively controls the free-wheeling means of a front axle differential.

Referring now to FIG. 10, which is a flow chart of the free-wheeling (F/W) mode correction subroutine, the first step S38 in FIG. 10 is to make a first decision: "is the transfer case T in the 2W-H drive mode?". If the answer to the first decision is yes, an actuation signal is applied to the first solenoid valve 131 at a step S39 to unlock the axle splitting means 120 of the free-wheeling means 130 so as to shift it into its unlock or free state. If the answer to the first decision is no, an actuation signal is applied to the second solenoid valve 132 at a step S40 to lock the free-wheel means 85 so as to shift it into its locked state. In any case, the final step orders return to the main routine.

At a step S6 in the main routine, the controller 60 causes the drive mode indicator 72 to switch on or off the 4WD indicator lamp 83 and the C/D indicator lamp 84 in the patterns shown in the following table so as to display a present driving mode.

| Drive mode | 4WD Lamp | C/D Lamp |
| --- | --- | --- |
| 2W-H | OFF | OFF |
| 4W-DL-H | ON | ON |
| 4W-DF-H | ON | OFF |

A step S7 following the indication of drive mode is to read the conditions of the 2W-4W shift switch 68A and the DL-DF shift switch 68B to make a third decision at a step S8 in the main routine: "is each shift switch correctly operated with respect to the present drive mode?" This decision is made based on the conditions shown in the following table indicating destination driving modes by operations of the DF-DL shift switch 68A and the 2W-4W shift switch 68B relative to the present drive mode:

| Present Drive Mode | DF-DL Shift Switch 68B | | 2W-4W Shift Switch 68A |
| --- | --- | --- | --- |
| | OFF→ON | ON→OFF | OFF→ON |
| 2W-H | 4W-DL-H | — | 4W-DF-H |
| 4W-DL-H | — | 4W-DF-H | Not Shift |
| 4W-DF-H | 4W-DL-H | — | 2W-H |

If the answer to the third decision is no, the steps S2 through S7 are repeated. On the other hand, if the answer to the third decision is yes, first through fifth drive mode shift subroutines are selectively called for according to operated states of the shift switches 68A and 68B.

Figure 11:
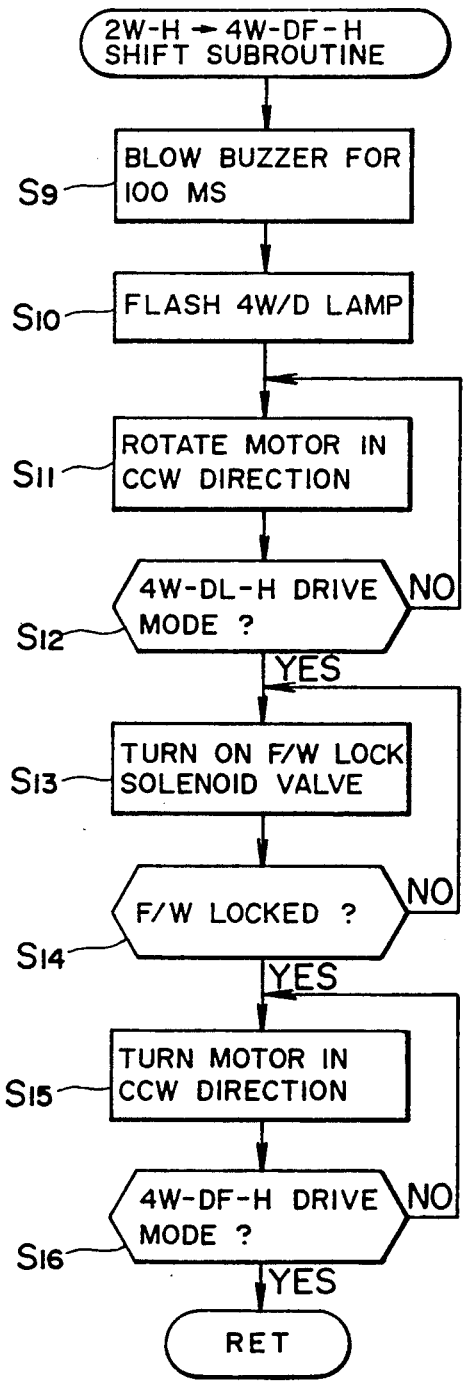
FIG. 11 is a flow chart illustrating a first drive mode shift sequence or subroutine for the controller in which the transfer case is shifted into a four-wheel, differential-free, high-speed drive mode from a two-wheel high-speed range drive mode.

Referring now to FIG. 11, which is a flow chart of the first drive mode shift subroutine for shifting the transfer case T from the 2W-H to the 4W-DF-H drive mode, the first step at S9 in FIG. 11 is to causes the buzzer 71 to sound for about 100 msec. upon receiving an instruction signal provided by a shift operation of 2-4 shift switch 68A. At a step S10 following to the step S9, the 4WD lamp 73 is repeatedly turned on and off in such a way that a turned-on time period is longer than a turned-off time period, thereby to indicate that the transfer case T is now being shifted into the 4W from the 2W drive mode.

At a step S11, the motor 61 is caused to rotate in the counterclockwise (CCW) direction to slide the second clutch sleeve 44 toward the position $P_{4L}$ from the position $P_2$. Then a first decision in this subroutine is made based on the drive mode signal provided by the drive mode sensor SW1 at a step S12: "is the transfer case T shifted in 4W-DL-H drive mode?" If the answer to the first decision is no, the steps S11 and 12 are repeated until the transfer case T is shifted in the 4W-DL-H drive mode. If the answer to the first decision is yes, the controller 60 at a step S13 provides an energization signal which actuates the second solenoid valve 129 to connect the axle splitting means 120 of the free-wheeling means 130, locking the free-wheeling means 130. As the lock sensor SW2 detects the shift control rod 122 of the axle splitting means 120 at its connecting position to provide a signal, based on the presence of the signal, a second decision is made at a step S14: "is the free-wheeling means locked?". If the answer to the second decision is no, the steps S13 and S14 are repeated until the lock sensor SW2 provides a lock signal, namely, the free-wheeling means is locked. If the answer is yes, the motor 61, at a step 15, is caused to rotate in the CCW direction to displace the second shift clutch 44 to the position $P_{4L}$ from the position $P_{4F}$ so as to shift the transfer case T into 4W-DF-H drive mode.

At the final step S16 in this subroutine, a third decision is made based on the drive mode signal provided by the mode sensor SW1: "is the transfer case T ready for the 4W-DF-H drive mode?". If the answer to the third decision is no, the steps S15 and S16 are repeated until the transfer case T is shifted into the 4W-DF-H drive mode. On the other hand, if the answer to the third decision is yes, then the final step orders return to the main routine.

Figure 12:
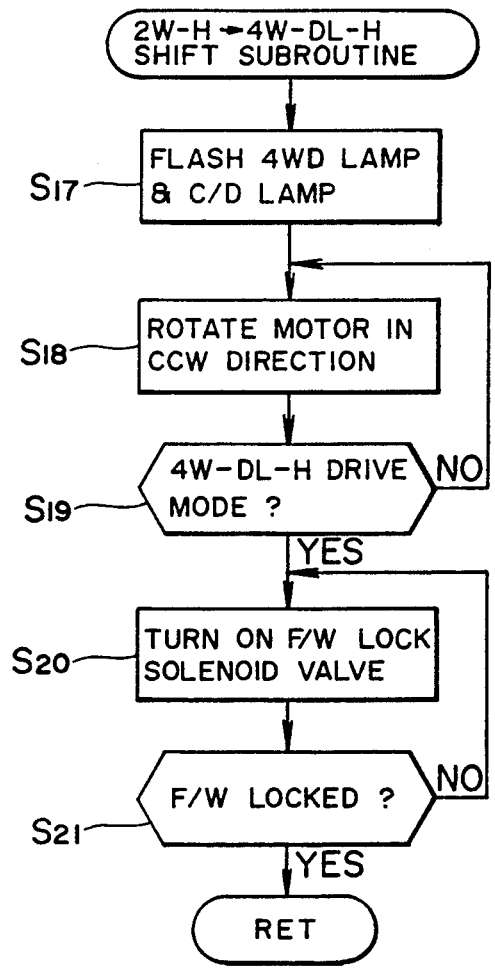
FIG. 12 is a flow chart illustrating a second drive mode shift sequence or subroutine for the controller in which the transfer case is shifted into a four-wheel, differential-locked, high-speed range drive mode from the two-wheel, high-speed range drive mode.

Referring now to FIG. 12, which is a flow chart of the second drive mode shift subroutine for shifting the transfer case T into the 4W-DL-H from the 2W-H drive mode, the first step S17 in FIG. 12 is to read the conditions of the shift switches 68A and 68B so as to repeatedly turn on and off the 4WD lamp 82 and the C/D lamp 83 in the same way as at the step S10 in the first drive mode shift subroutine. Steps S18 to S21, which follow step 17, have the same operations or decisions as the steps S11 to S14 in the first drive mode shift subroutine shown in FIG. 11. Therefore, no repetition of description is needed here. If the answer to the second decision at the step S21 regarding whether the free-wheeling means 130 is locked is yes, then the final step orders return to the main routine shown in FIG. 8.

Figure 13:
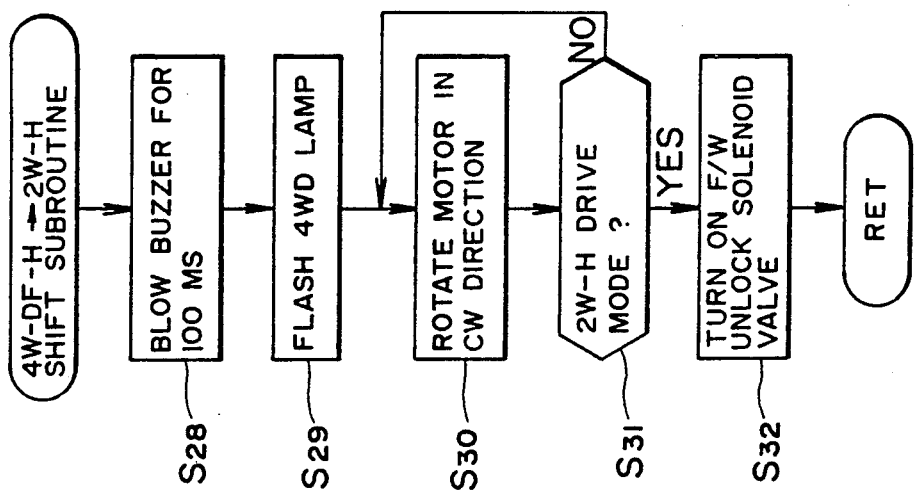
FIG. 13 is a flow chart illustrating a third drive mode shift sequence or subroutine for the controller in which the transfer case is shifted into the four-wheel, differential-free, high-speed range drive mode from the four-wheel, differential-locked, high-speed range drive mode.

FIG. 13 is a flow chart of the third drive mode shift subroutine for shifting the transfer case T into 4W-DF-H drive mode from the 4W-DL-H drive mode. The first step S22 in FIG. 13 is to read the condition of the shift switch 68B so as to repeatedly turn on and off the C/D lamp 83 of the mode indicator 82. Following the flash of the C/D lamp 83, the motor 61 is caused to rotate in the CCW direction to displace the second shift clutch 44 so as to shift the transfer case T into the 4W-DF-H drive mode from the 4W-DL-H drive mode.

At the final step S24 a first decision in the third drive mode shift subroutine is made based on the drive mode signal provided by the mode sensor SW1: "is the transfer case shifted into the 4W-DF-H drive mode?". If the answer to the first decision is no, the steps S23 and S24 are repeated until the transfer case T is completely shifted into the 4W-DF-H drive mode. If the answer is yes, then the final step orders return to the main routine shown in FIG. 8.

Figure 14:
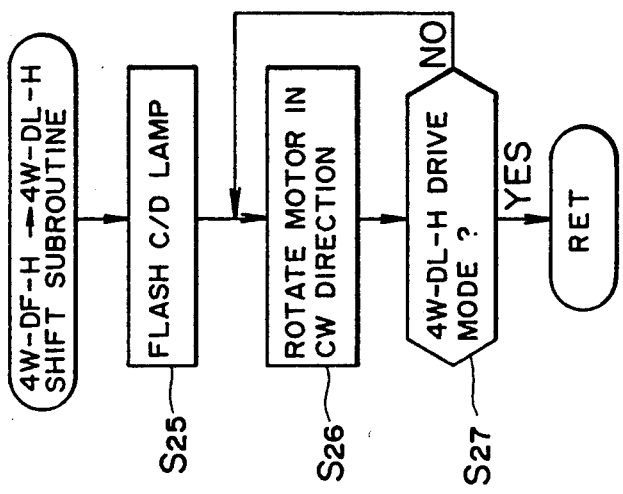
FIG. 14 is a flow chart illustrating a fourth drive mode shift sequence or subroutine for the controller in which a reversed transition of FIG. 13 is effected.

Referring now to FIG. 14, which is a flow chart of the fourth drive mode shift subroutine for shifting the transfer case into the 4W-DL-H drive mode from the 4W-DF-H drive mode. In this fourth drive mode shift subroutine, when the DF-DL shift switch 68B is pushed back, a signal is provided to cause the C/D lamp 83 repeatedly to turn on and off at the first step S25. At a second step S26 following the flashing of the C/D lamp 83, the motor 61 is caused to rotate in the CW direction so as to shift the transfer case T in the 4W-DL-H drive mode.

The final step S27 is to make a first decision in FIG. 14: "is the transfer case T shifted into the 4W-DL-H drive mode?". This first decision is made based on the drive mode signal provided by the mode sensor SW1. If the answer to the first decision is no, indicating the transfer case T not yet completely shifted in the 4W-DL-H, the steps S26 and S27 are repeated. If the answer to the first decision is yes, the final step S27 orders return to the main routine shown in FIG. 8.

Figure 15:
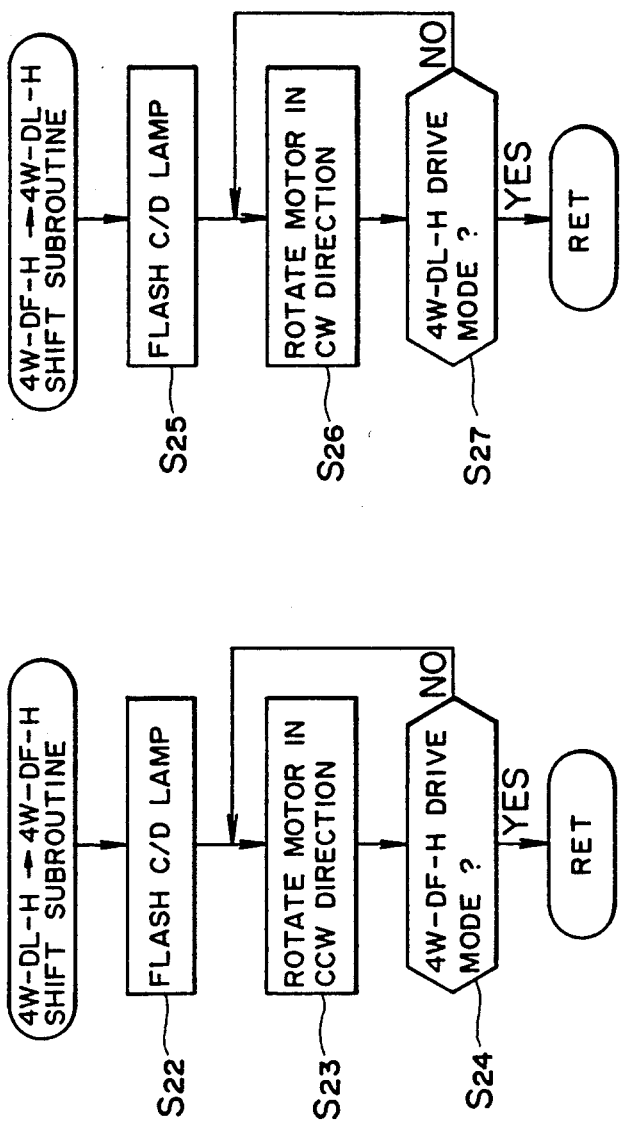
FIG. 15 is a flow chart illustrating a fifth drive mode shift sequence or subroutine for the controller in which a reversed transition of FIG. 11 is effected.

Finally, referring to FIG. 15, which is a flow chart of the fifth drive mode shift subroutine for shifting the transfer case T into the 2W-H drive mode from the 4W-DF-H, the first step S28 is to cause the buzzer 81 to sound for about a 100 msec. time period in response to the slide operation of the 2W-4W shift switch 68A. At a step S29 following the blowing of the buzzer 81, the 4WD lamp 83 of the indicator 82 is repeatedly turned on and off. However, in this fifth drive mode shift subroutine, contrary to the first drive mode shift subroutine shown in FIG. 11, the 4W lamp 83 is turned on for a time period shorter than the turned-on time period so as to indicate that the transfer case T has begun to be shifted into 2W-H drive mode.

At a third step S30 following the flash of the 4W lamp 83, the motor 61 is caused to rotate in the CW direction to return the transfer case T into the 2W-H drive mode from the 4W-DF-H drive mode through the 4W-DL-H drive mode. When the motor 61 begins to rotate, a first decision in this fifth drive mode shift subroutine is made based on the drive mode signal provided by the mode sensor SW1 at a step S31: "is the transfer case T shifted into 2W-H drive mode?". If the answer to the first decision is no, the steps S30 and S31 are repeated. On the other hand, if the answer to the first decision is yes, indicating transfer case T completely shifted into the 2W-H drive mode to provide a shift signal, the first solenoid valve 131 is energized at a step S32 to disengage the split means 120 of the free-wheeling means 130 so as to unlock the free-wheeling means 130. The final step orders return to the main routine shown in FIG. 9.

As is apparent from the above description, because, as long as the shift mode A is detected, the mode correction subroutine shown in FIG. 9 is repeated, the shift of the transfer case T from the 4W-DL-H drive mode to the 2W-H drive mode is disabled even though the 2W-4W shift switch 68A is secondarily operated with or without an intention to shift the transfer case T into the 2W-H drive mode. Therefore, the controller 60 can prevent the transfer case T from being shifted to the 2W drive mode from the 4W-DL drive mode. In this sense, the controller 60 functions as prohibitive means for the shift of the transfer case T from the 4W-DL-H drive mode to the 2W-H drive mode.

In operation of the operating system of the transfer case T of the preferred embodiment of the present invention constructed as described above, five different drive modes are selected as follows:

[I] Shifting from 2W-H drive mode to 4W-DF-H drive mode:

For this shifting, the 2W-4W shift switch 68A of the transfer shift means 68 is slid by the drive in the driver's compartment. When the 2W-4W shift switch 68A is slid to select the 4W drive mode, the motor 61 is caused to rotate in the CCW direction so as to displace the second sleeve clutch 44 to the position $P_{4L}$ (shown in FIG. 3C) from the position $P_2$ (shown in FIG. 3A).

When the drive mode sensor SW1 provides the mode signal indicating that the differential gear assembly 4 is completely shifted in the 4W-DL drive mode, the second solenoid valve 132 is energized to lock the axle splitting means 120 of the free-wheeling means 130. After the completion of locking the axle splitting means 120, the motor 61 further turns to displace the second sleeve clutch 44 to the position $P_{4F}$ (shown in FIG. 3B) so as to finally shift the transfer case T into the 4W-DF-H driving mode.

[II] Sifting from 4W-DF-H drive mode to 2W-H drive mode:

The 2W-4W shift switch 68A of the transfer shift means 68 is operated for the second time. As a result of this second operation of the 2W-4W shift switch 68A, the second sleeve clutch 44 of the differential gear shift means 17 is displaced from the position $P_{4F}$ to the position $P_2$ so as to shift the differential gear assembly 4 into the 2W drive mode. Because the completion of the shift of the differential gear assembly 4 into the 2W drive mode causes the first solenoid valve 131 to be energized, the axle splitting means 120 of the free-wheeling means 130 is unlocked, completely bringing the transfer case T into the 2W-H drive mode.

[III] Shifting from 2W-H drive mode to 4W-DL-H drive mode

For this shifting, the DF-DL shift switch 68B is pushed-in and held there. As a result, the second sleeve clutch 44 of the differential gear shift means 17 is displaced from the position $P_2$ to the position $P_{4L}$ to shift the transfer gear assembly 4 into the 4W-DL drive mode, shifting the transfer case T into the 4W-DL-H drive mode. When the drive mode sensor SW1 detects that the differential gear assembly 4 is completely shifted into the 4W-DL drive mode, the second solenoid valve 132 is energized to lock the axle splitting means 120 of the free-wheeling means 130, completely bringing the transfer case T into the 4W-DL-H drive mode.

[IV] Shifting from 4W-DF-H drive mode to 4W-DL-H drive mode

When the DF-DL shift switch 68B is pushed in and held there while the 2W-4W shift switch 68A has been operated to select the 4W drive mode, the second sleeve clutch 44 of the differential gear shift means 17 is displaced to the position $P_{4L}$ from the position $P_{4F}$ to shift the differential gear assembly 4 into 4W-DF mode to the 4W-DL drive mode while maintaining it in the 4W drive mode, shifting the transfer case T into the 4W-DL-H drive mode.

[V] Shifting from 4W-DL-H drive mode to 4W-DF-H drive mode

The DF-DL shift switch 68B is pushed back to cause the motor 61 to displace the second sleeve clutch 44 to the position $P_{4F}$ from the position $P_{4L}$ so as to shift the differential gear assembly 4 into 4W-DF drive mode while maintaining it in the 4W drive mode, shifting the transfer case T into the 4W-DF-H drive mode.

Although the present invention has been fully described by way of the preferred embodiment thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A transfer case operation mode shifting apparatus used on a vehicle equipped with part-time four-wheel drive having a center-differential which is shiftable between a differential-locked and a differential-free drive mode of operation and between a two-wheel and a four-wheel drive mode of operation, said apparatus comprising:

operation mode selecting means operated in a driver's compartment of a vehicle to select a drive mode of operation of said center-differential;

power drive operation mode shift means for selectively shifting said center-differential from one drive mode of operation to another;

control means for causing said power drive operation mode shift means to shift said center-differential into said selected drive mode of operation in a predetermined sequence according to an operation of said operation mode selecting means; and said control means including mode detecting means for detecting said power drive operation mode shift means placed in a position where said center-differential is in a differential-locked four-wheel drive mode of operation so as to inhibit a transition of said center-differential to a two-wheel drive mode of operation from said differential-locked four-wheel drive mode of operation.

2. An apparatus as defined in claim 1, said power drive operation mode shift means comprises a reversible electric motor and a mechanical shift member shifted by said motor according to an operation of said drive mode selecting means so as to shift said center-differential into a selected drive mode of operation.

3. An apparatus as defined in claim 2, wherein said mode detecting means comprises a position sensor cooperating with said reversible electric motor for detecting an angular position of said reversible electric motor.

4. An apparatus as defined in claim 2, wherein said drive mode selecting means includes at least an electric switch for selecting a two-wheel and a four wheel drive mode of operation of said center-differential.

5. An apparatus as defined in claim 2, wherein said center-differential comprises a planetary gear assembly having at least a ring gear coupled to an input shaft of said planetary gear assembly, pinion gears, a pinion carrier coupled to one of two output shafts of said planetary gear assembly associated with front and rear output shafts of said center-differential and a sun gear coupled to the other output shaft of said planetary gear assembly; hub members arranged side by side coaxially with respect to the axis of rotation of said planetary gear assembly and being coupled to said two output shafts; and an axially movable member which is moved by said power drive operation mode shift means to engage one of said hub members coupled to one of said two output shafts with at least one of the remaining hub members for selectively locking together said hub members so as to thereby shift said center-differential into a desired drive mode.

6. An apparatus as defined in claim 5, wherein said power drive operation mode shift means has three shift positions for shifting said center-differential into a two-wheel drive mode, a four-wheel differential-locked drive mode and a four-wheel differential-free drive mode, arranged side by side in this order, and further comprising clutch means incorporated within an output shaft of an axle differential associated with wheels which are rendered non-driven when the vehicle is in motion in said two-wheel drive mode and adapted to disconnect the transmission of driving power between said axle differential and said non-driven wheel when said vehicle is in motion in said two-wheel drive mode and to connect said transmission of driving power between said axle differential and said non-driven wheels when said vehicle is in motion in said four-wheel drive mode, said clutch means being clutched so as to thereby connect said transmission of driving power between said axle differential and said non-driven wheel upon an intermediate transition of said power drive operation mode shift means to said four-wheel drive differential-locked drive mode shift position when said center-differential is shifted from said two-wheel drive mode to said four-wheel differential-locked drive mode and being unclutched so as to thereby disconnect said transmission of driving power between said axle differential and said non-driven wheel upon the completion of transition of said power drive operation mode shift means to said two-wheel drive mode shift position when said center-differential is shifted from said four-wheel center-differential-free drive mode to said two-wheel drive mode.

7. An apparatus as defined in claim 6, further comprising indication means comprises a lamp flashing in different ways so as to indicate a transition of said center-differential from one to another between said two-wheel and four-wheel drive modes.

8. An apparatus as defined in claim 1, wherein said power drive operation mode shift means has three shift positions for shifting said center-differential into a two-wheel drive mode, a four-wheel differential-locked drive mode and a four-wheel differential-free drive mode, arranged side by side in this order, and further comprising clutch means incorporated in an output shaft of an axle differential associated with wheels which are rendered non-driven when the vehicle is in motion in said two-wheel drive mode and adapted to disconnect the transmission of driving power between said axle differential and said non-driven wheel when said vehicle is in motion in said two-wheel drive mode and to connect said transmission of driving power between said axle differential and said non-driven wheel when said vehicle is in motion in said four-wheel drive mode, said clutch means being clutched so as to thereby connect said transmission of driving power between said axle differential and said non-driven wheel upon an intermediate transition of said power drive operation mode shift means to said four-wheel differential-locked drive mode shift position when said center-differential is shifted from said two-wheel drive mode to said four-wheel differential-free drive mode and being unclutched so as to thereby disconnect said transmission of driving power between said axle differential and said non-driven wheel upon the completion of transition of said power drive operation mode shift means to said two-wheel drive mode shift position when said center-differential is shifted from said four-wheel differential-free drive mode to said two-wheel drive mode.

9. An apparatus as defined in claim 1, further comprising indication means for indicating a transition mode from one to the other between said two-wheel and four-wheel drive modes.

10. An apparatus a defined in claim 9, wherein said indication means comprising a lamp flashing in different ways between said two transition modes.

* * * * *